(12) United States Patent
Mukerji et al.

(10) Patent No.: US 9,552,594 B2
(45) Date of Patent: *Jan. 24, 2017

(54) SYSTEM FOR PRESENTING MARKETING CONTENT IN A PERSONAL TELEVISION CHANNEL

(71) Applicant: AT&T INTELLECTUAL PROPERTY I, LP, Atlanta, GA (US)

(72) Inventors: Ankur Mukerji, Half Moon Bay, CA (US); Charles V. Scott, Austin, TX (US); Scott White, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/966,699

(22) Filed: Dec. 11, 2015

(65) Prior Publication Data
US 2016/0098761 A1 Apr. 7, 2016

Related U.S. Application Data

(63) Continuation of application No. 12/025,913, filed on Feb. 5, 2008, now Pat. No. 9,241,188.

(51) Int. Cl.
| | |
|---|---|
| *H04N 5/445* | (2011.01) |
| *G06Q 30/02* | (2012.01) |
| *G06Q 20/10* | (2012.01) |
| *H04N 21/2225* | (2011.01) |
| *H04N 21/2668* | (2011.01) |

(Continued)

(52) U.S. Cl.
CPC .......... *G06Q 30/0269* (2013.01); *G06Q 20/10* (2013.01); *G06Q 30/0275* (2013.01); *H04N 21/2225* (2013.01); *H04N 21/252* (2013.01); *H04N 21/2547* (2013.01); *H04N 21/25891* (2013.01); *H04N 21/2668* (2013.01); *H04N 21/4312* (2013.01); *H04N 21/443* (2013.01); *H04N 21/4667* (2013.01); *H04N 21/4788* (2013.01); *H04N 21/64322* (2013.01); *H04N 21/812* (2013.01); *H04N 21/8166* (2013.01)

(58) Field of Classification Search
USPC ........................................................ 725/43
See application file for complete search history.

(56) References Cited

U.S. PATENT DOCUMENTS

| | | |
|---|---|---|
| 6,774,926 B1 | 8/2004 | Ellis |
| 2003/0093792 A1 | 5/2003 | Labeeb et al. |

(Continued)

OTHER PUBLICATIONS

"Google AdSense", www.google.com/adsense; Jun. 28, 2011.

(Continued)

*Primary Examiner* — Michael Hong
(74) *Attorney, Agent, or Firm* — Guntin & Gust, PLC; Ralph Trementozzi

(57) ABSTRACT

A system that incorporates teachings of the present disclosure may include, for example, a media processor having a controller that receives media content from a subscriber of a media communication system, receive marketing content from a marketing information source, and present the media content and the marketing content in a personal TV channel. The media content is presented in a first region of a two-dimensional, segmented display configuration, with the media content presented in a first region and the marketing content presented in a second region of the segmented display configuration. Other embodiments are disclosed.

20 Claims, 9 Drawing Sheets

(51) Int. Cl.

| | |
|---|---|
| *H04N 21/443* | (2011.01) |
| *H04N 21/4788* | (2011.01) |
| *H04N 21/81* | (2011.01) |
| *H04N 21/25* | (2011.01) |
| *H04N 21/2547* | (2011.01) |
| *H04N 21/258* | (2011.01) |
| *H04N 21/431* | (2011.01) |
| *H04N 21/466* | (2011.01) |
| *H04N 21/643* | (2011.01) |

(56) References Cited

U.S. PATENT DOCUMENTS

| | | |
|---|---|---|
| 2004/0117822 A1 | 6/2004 | Karaoguz |
| 2006/0059509 A1 | 3/2006 | Huang et al. |
| 2006/0123455 A1 | 6/2006 | Pai et al. |
| 2006/0206912 A1 | 9/2006 | Klarfeld et al. |
| 2007/0199019 A1 | 8/2007 | Angiolillo et al. |
| 2007/0288953 A1 | 12/2007 | Sheeman et al. |
| 2008/0092159 A1 | 4/2008 | Dmitriev et al. |
| 2008/0155627 A1 | 6/2008 | O'Connor et al. |
| 2008/0271080 A1 | 10/2008 | Gossweiler et al. |

OTHER PUBLICATIONS

Youtube, LLC, "Broadcast Yourself", 2 pages, http://www.youtube.com, Web site last visited Jul. 28, 2011, Dec. 20, 2007, 2 pages.

100

600

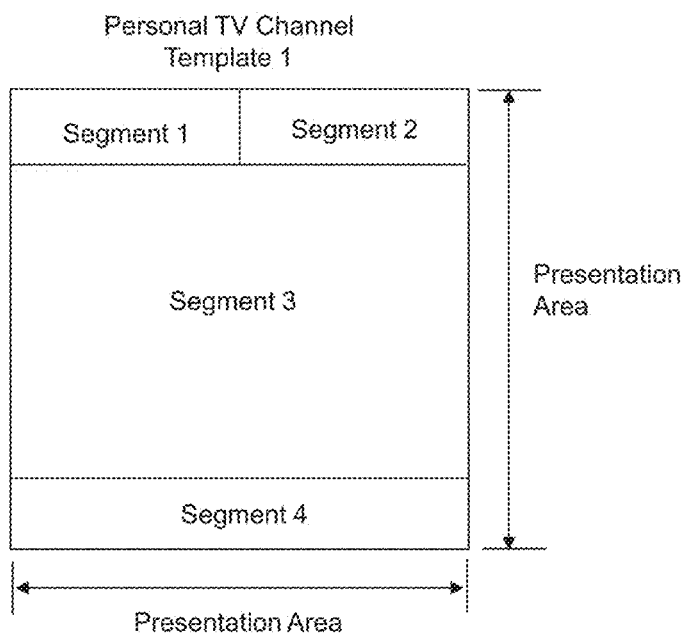
FIG. 7
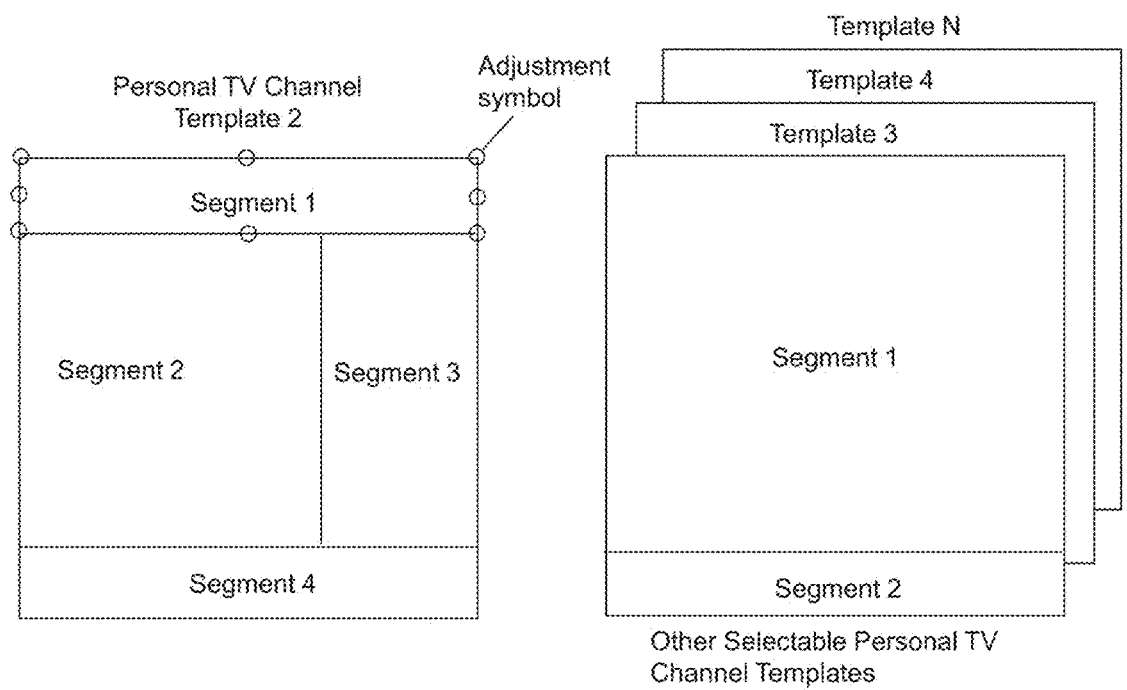

SYSTEM FOR PRESENTING MARKETING CONTENT IN A PERSONAL TELEVISION CHANNEL

CROSS-REFERENCE TO RELATED APPLICATION(S)

This application is a continuation of and claims priority to U.S. patent application Ser. No. 12/025,913 filed Feb. 5, 2008 by Mukerji et al., entitled "System for Presenting Marketing Content in a Personal Television Channel." All sections of the aforementioned application(s) are incorporated herein by reference in its entirety.

FIELD OF THE DISCLOSURE

The present disclosure relates generally to presentation of marketing content and more specifically to a system for presenting marketing content in a personal television channel.

BACKGROUND

Social networking has become very popular on the Internet. Common socialization techniques include blogging, and posting personal information on social networks such as YouTube.com™, MySpace.com™ and Facebook.com™. Social networking can also be extended to media communication systems such Internet Protocol television (IPTV), cable TV, or satellite TV capable of providing broadcast and peer-to-peer personal TV channels.

BRIEF DESCRIPTION OF THE DRAWINGS

FIGS. 7-9 depict exemplary illustrations of graphical user interface (GUI) templates and modules used by the method of FIG. 6.

DETAILED DESCRIPTION

In one embodiment of the present disclosure, a method can involve monitoring media content presented in a personal television (TV) channel of a media communication system, wherein the personal TV channel is procured by at least one of a plurality of subscribers of the media communication system, detecting one or more contextual patterns in the media content monitored in the personal TV channel, selecting one or more advertisements according to the one or more contextual patterns, and presenting the one or more advertisements in a portion of the personal TV channel.

In another embodiment of the present disclosure, a computer-readable storage medium can have computer instructions for presenting marketing content in a personal TV channel of a subscriber of a media communication system according to a contextual determination of media content presented in the personal TV channel.

In yet another embodiment of the present disclosure, a media processor can have a controller to receive media content from a subscriber of a media communication system, receive marketing content from a marketing information source, and present the media content and the marketing content in a personal TV channel procured by the subscriber.

In another embodiment of the present disclosure, a method can involve presenting in a personal TV channel managed by a subscriber of a television communication system marketing content contextually related to media content presented in the personal TV channel.

Figure 1:
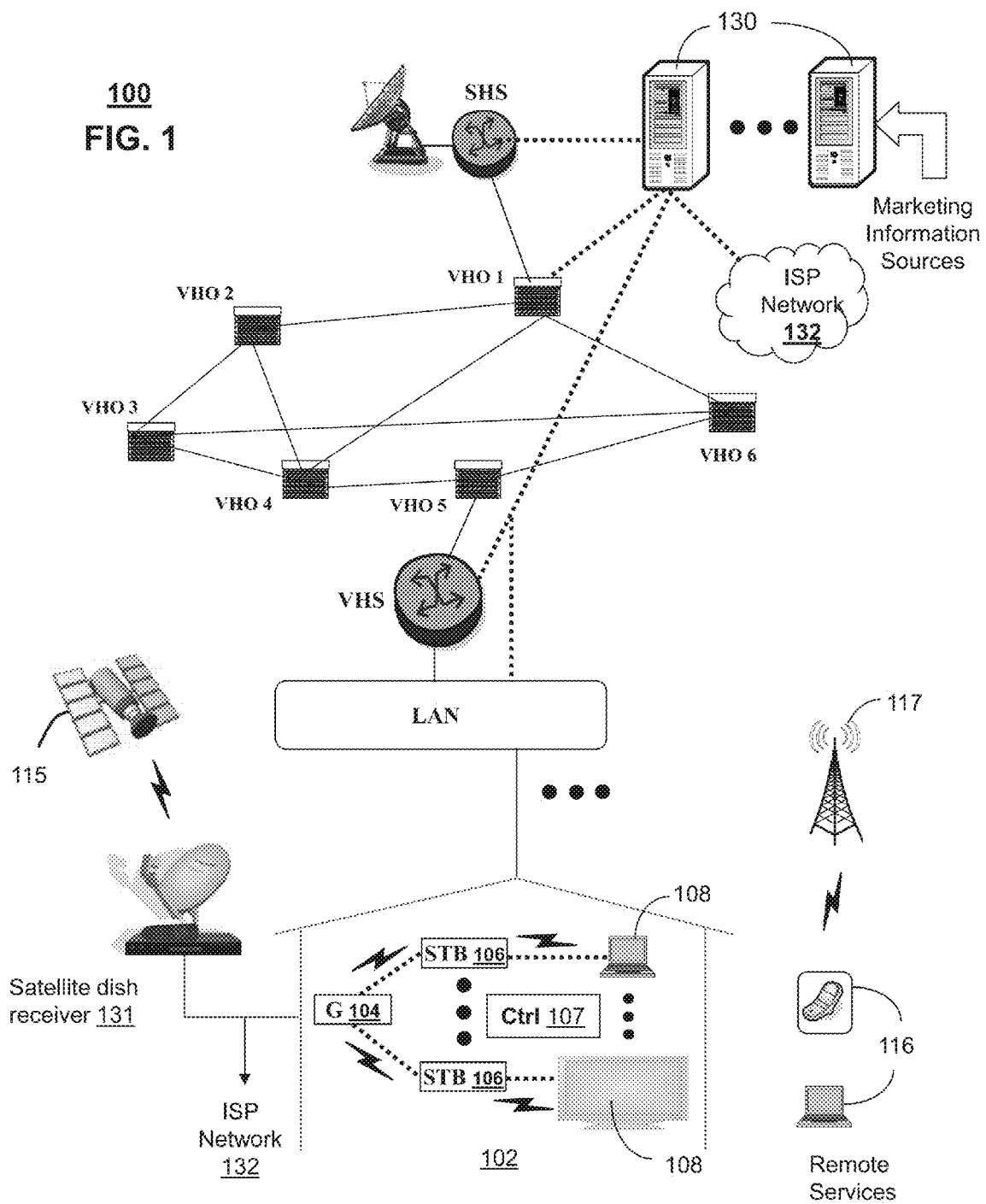
FIGS. 1-4 depict exemplary embodiments of communication systems that provide media services.

FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). Another distinct portion of the one or more computing devices 130 can be used as a personal television (TV) system (herein referred to as personal TV system 130) for constructing personal TV channels purchased by subscribers for distributing media content of the subscriber. In another illustrative embodiment, the media processor 106 of a subscriber of the first communication system 100 can be used as a media source for broadcasting media content in a personal TV channel. The personal TV system 130 can provide personal TV services to subscribers who for example cannot afford a media processor 106 capable of providing such personal TV channel services.

The personal TV system 130 can also be connected to one or more marketing information sources. Marketing information sources can represent among other things storage facilities or databases which contain marketing content such as advertisements, promotions, coupons, etc. The promoters of the marketing content can supply the marketing content to the marketing information sources directly or by way of a broker such as the service provider of the first communication system 100 which can screen and manage distribution of the marketing content on personal TV channels of subscribers who have offered a portion of the viewing area of their channel for presentation of marketing content.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
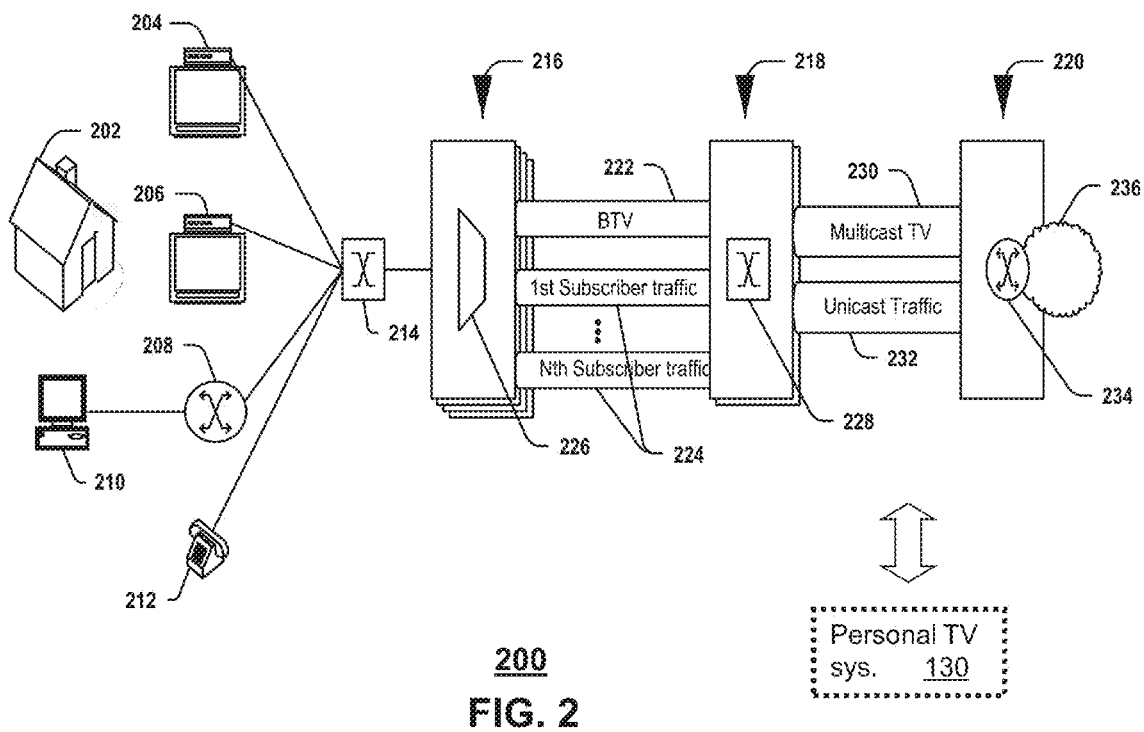

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a digital subscriber line access multiplexer (DSLAM). The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an Internet Protocol Television (IPTV) channel After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The personal TV system 130 of FIG. 1 can be applied to the second communication system 200 for purposes of broadcasting marketing content and media content supplied by subscribers in a personal TV channel of the second communication system. In another illustrative embodiment, the STBs 204, 206 of the second communication system 200 can be used as a media source for broadcasting media content in the personal TV channel of the subscriber as well as marketing content provided by the personal TV system 130.

Figure 3:
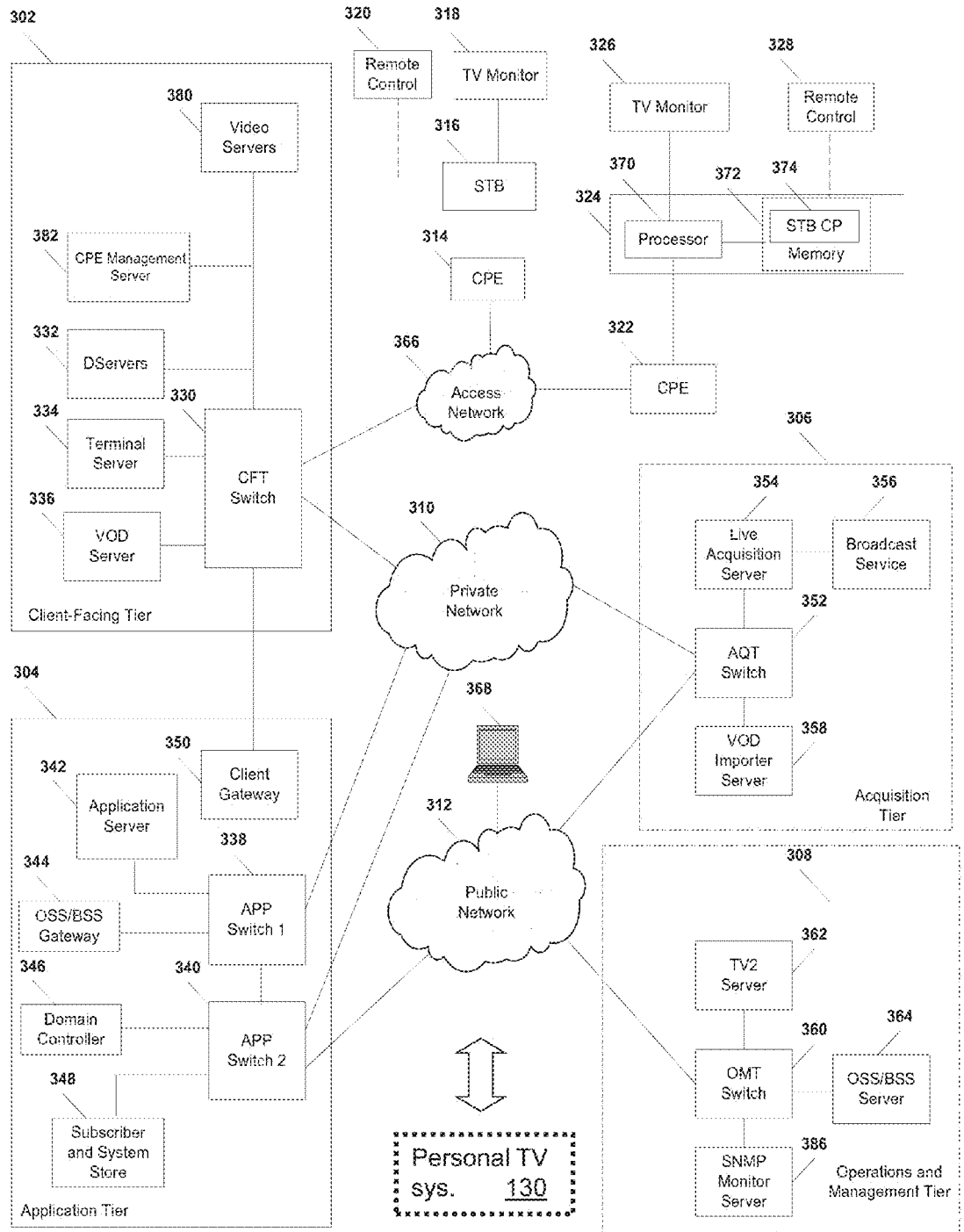

FIG. 3 depicts an exemplary embodiment of a third communication system 300 for delivering media content. Communication system 300 can be overlaid or operably coupled with communication systems 100-200 as another representative embodiment of said communication systems.

As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an Internet Protocol Television (IPTV) access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include digital subscriber line (DSL) modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol (SNMP) monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The personal TV system 130 of FIGS. 1-2 can be applied to the third communication system 300 for purposes of broadcasting marketing content and media content supplied by subscribers in a personal TV channel of the second communication system. In another illustrative embodiment, the STBs 316, 324 of the third communication system 300 can be used as a media source for broadcasting media content in the personal TV channel of the subscriber and marketing content supplied by the personal TV system 130.

It should be apparent to one of ordinary skill in the art from the foregoing media system embodiments that other suitable media systems for distributing broadcast media content as well as peer-to-peer exchange of content in personal TV channels can be applied to the present disclosure.

Figure 4:
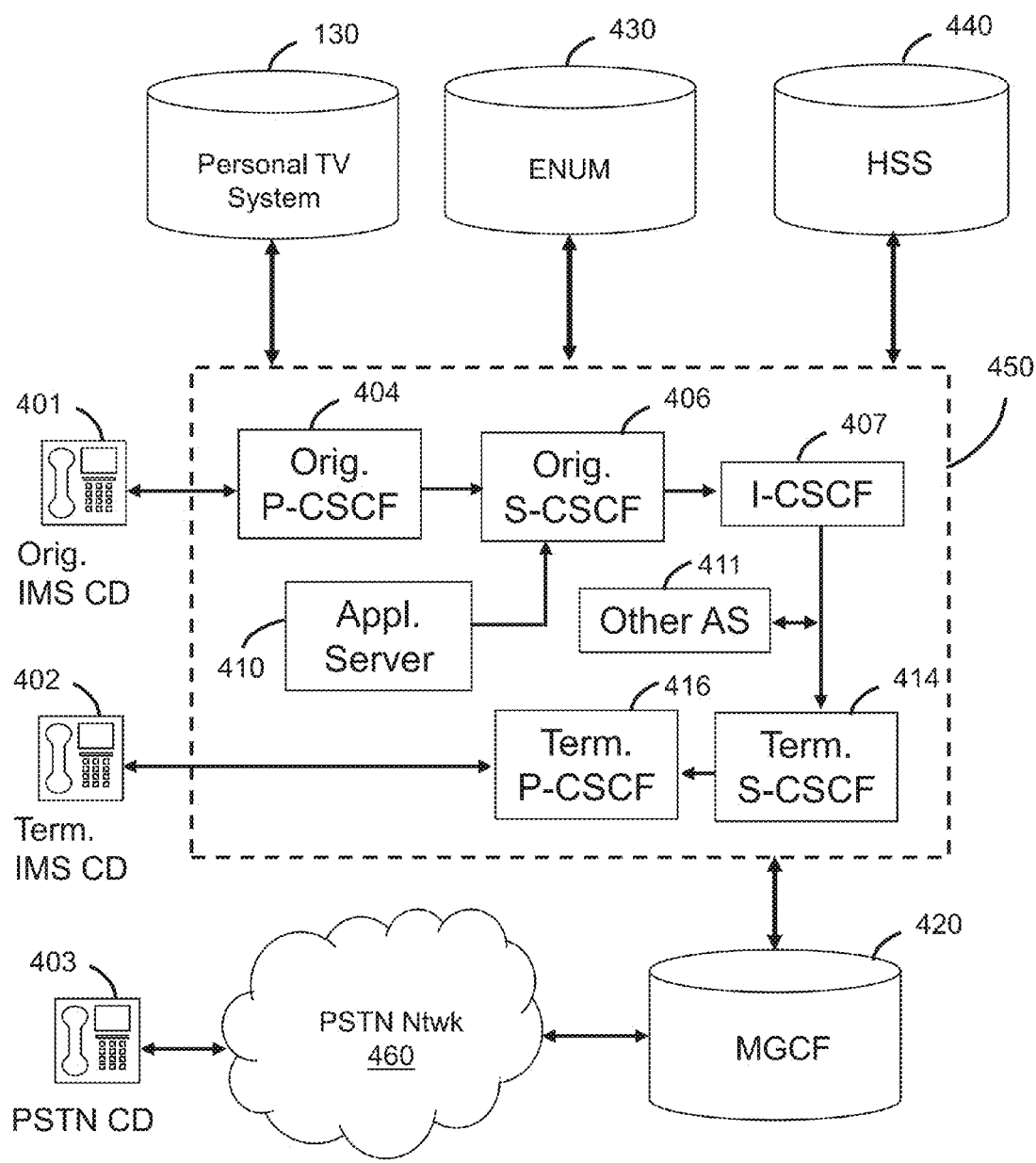

FIG. 4 depicts an exemplary embodiment of a communication system 400 employing a IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) support by the HSS 440. To accomplish a communication session between CDs, an originating IMS CD 401 can submit a SIP INVITE message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (not shown).

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the personal TV system 130 previously discussed for FIGS. 1-3. In this representative embodiment, the personal TV system 130 can be accessed over a PSTN or VoIP channel of communication system 400 by common techniques such as described above.

Figure 5:
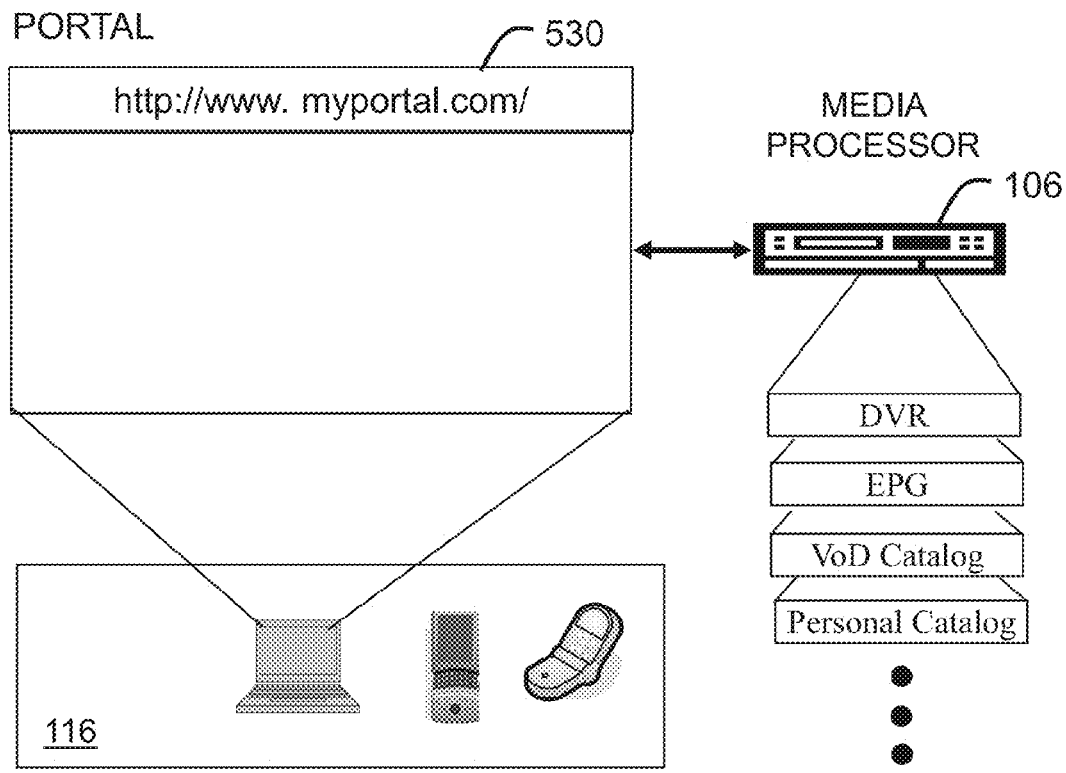
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), Video on Demand (VoD) catalog, a personal catalog stored in the STB (e.g., personal videos, pictures, audio recordings, etc.), personal TV channels, and so on. The portal 530 can also be an integral subsystem of the personal TV system 130.

A personal TV channel should not be confused with a common broadcast channel sourced by commercial and non-profit enterprises such as NBC (National Broadcasting Company), CBS (Columbia Broadcasting System), ABC (American Broadcasting Channel), PBS (Public Broadcasting System), ESPN (Entertainment and Sports Programming Network), HBO (Home Box Office), Disney Channel, Nickelodeon, and so on. Commercial and non-profit broadcast channels present media content managed in part by media supplier corporations such as, for example, General Electric, Walt Disney Company, and conglomerates such as Time Warner.

Commercial and non-profit media suppliers are generally speaking not subscribers or consumers of the media content presented by the abovementioned media communication systems of FIGS. 1-4. Service providers of the abovementioned media communication systems serve as distributors to commercial and non-profit media suppliers and generally present their media content on select channels which are commonly known and memorized by its subscribers because of their frequency of use. Subscribers of the abovementioned media communication systems consume the media content presented on these broadcast channels and are not offered an opportunity to intermix personal content with the content of the commercial and non-profit broadcast media suppliers.

Personal TV channels, on the other hand, provide subscribers of the abovementioned media communication systems a unique opportunity to broadcast media content managed by the subscribers. The source of media content presented by the subscriber can be of any form (e.g., audio, video, still pictures, text, and combinations thereof). The presentation timing of the media content broadcasted by the subscriber in personal TV channels can be determined at the subscriber's discretion. Similarly the subscriber has the discretion to choose any media content the subscriber desires to present in the personal TV channel Personal TV channels can be selected and consumed by subscribers of the media communication systems as well as others having access to the media communication systems by entering a channel number or other form of identification assigned by the service providers of the media communication systems to each personal TV channel.

Figure 6:
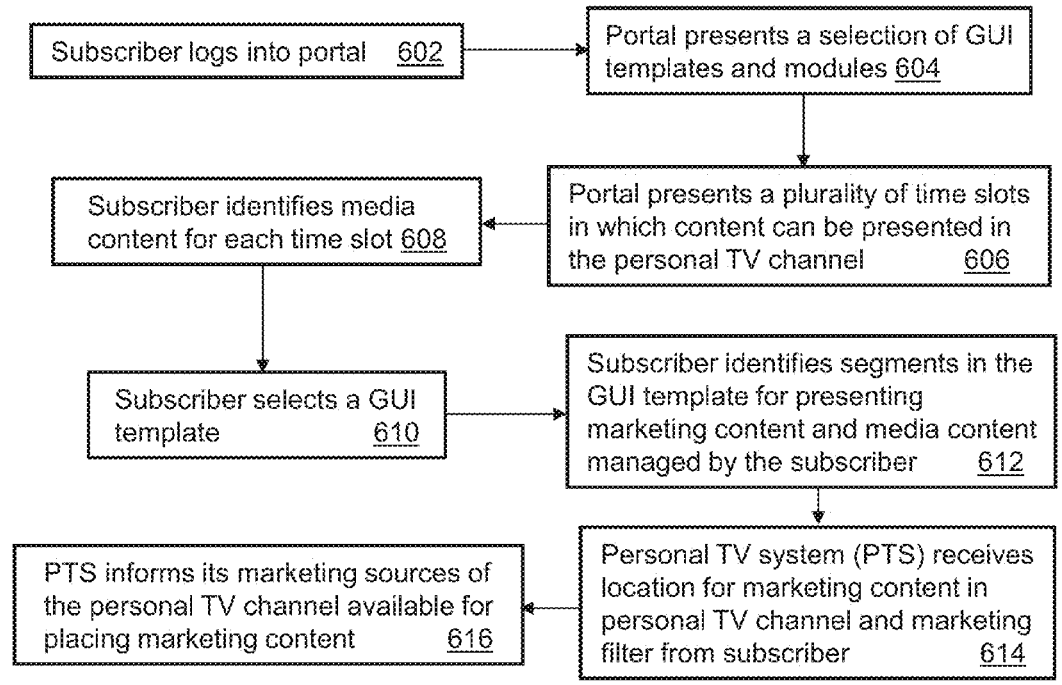
FIG. 6 depicts an exemplary method operating in portions of the communication systems of FIGS. 1-4.
Figure 6:
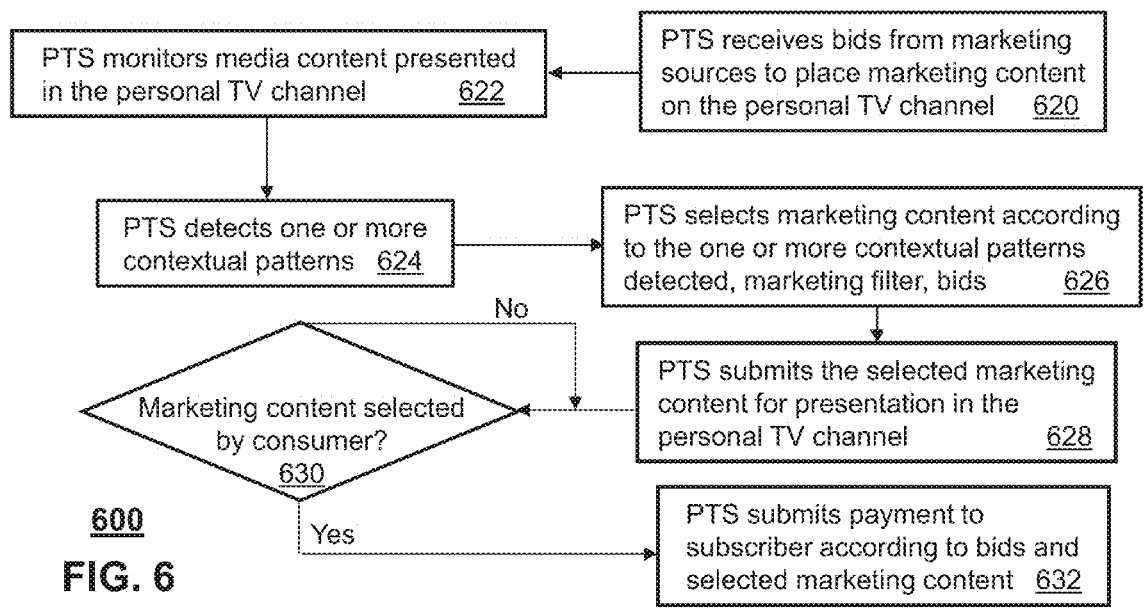
Figure 8:
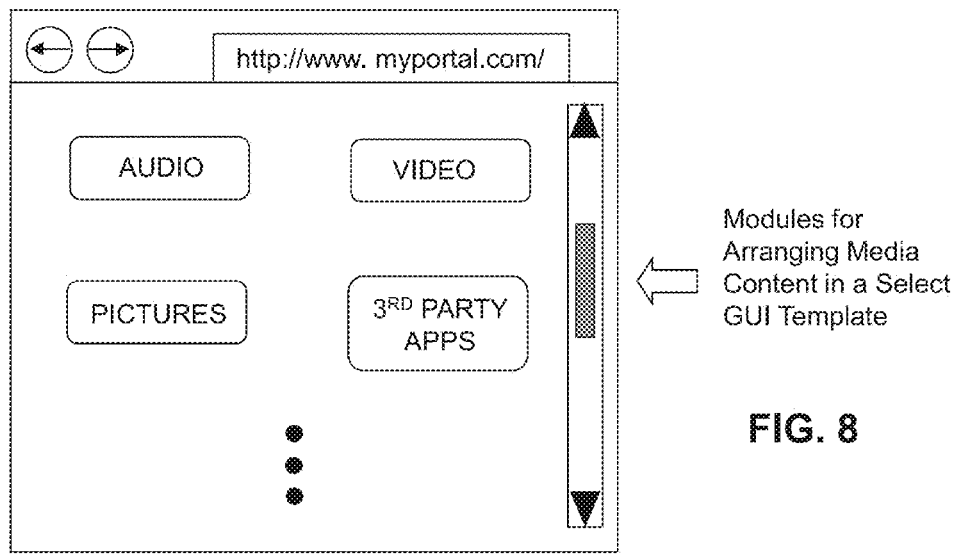
Figure 9:
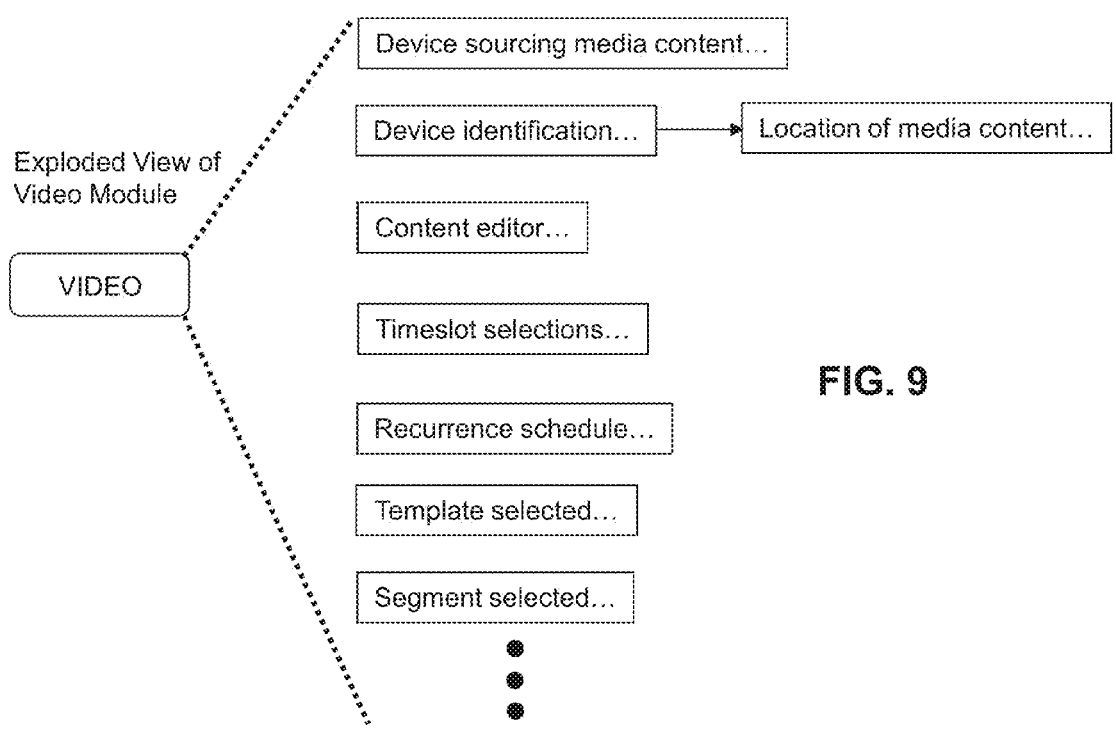

With the aforementioned embodiments in mind, FIG. 6 depicts an exemplary method 600 operating in portions of the media communication systems 100-500. Method 600 begins with step 602 in which a subscriber logs into the portal 530 by common means (e.g., URL, user name and password). To manage content on the personal TV channel, the portal 530 can be directed to present in step 604 a selection of graphical user interface (GUI) templates and modules such as shown in FIGS. 7-8 that can be used to manage the presentation of media content owned and/or controlled by the subscriber and marketing content supplied by marketing information sources of the personal TV system 130 in segments of a select GUI template.

As depicted in FIG. 7 the subscriber can be presented with an assortment of GUI templates to choose from. GUI template 1 for example segments a two dimensional presentation area or canvas of the personal TV channel into four segments. The subscriber can select one or more segments to carry any form of media content selected by the subscriber. The subscriber can also select one or more alternative segments to carry marketing content supplied by the personal TV system 130. For example, the subscriber can choose to place in segment 1 a live feed from a web cam operated by the subscriber to provide feedback to viewers of the personal TV channel Segment 2 can carry a sports commentary supplied by the subscriber in an instant messaging message. Segment 3 can carry a live feed of a sports program being viewed by the subscriber (e.g., ESPN program) or a DVR recording of the same. Segment 4 can carry marketing content supplied by the personal TV system 130. Templates 2-N can provide other forms of segmentation of the presentation area of the personal TV channel.

The portal 530 can provide the subscriber a means to browse through each template until the subscriber has found a desirable template. The portal 530 can also provide the subscriber a means to define a custom template if none of the predefined GUI templates are desirable. A custom GUI template can be defined by for example selecting an existing template or a new template. When an existing template is selected, the subscriber can redefine the size and location of the segments. A segment can be relocated by selecting with a computer mouse the segment and dragging it to another location in the presentation area of the personal TV channel. When a segment is moved the other segments can be resized by the portal 530 automatically to accommodate the new location of the segment.

To resize and/or reshape a segment (such as segment 1 of template 2 in FIG. 7), the subscriber can select the segment with a mouse pointer to highlight six adjustment symbols in the segment (middle sides and corners), and then select an adjustment symbol to resize it. A segment can be resized from the corners or sides as is typically performed with common drawing tools (e.g., Microsoft PowerPoint™) The subscriber can also delete segments by selecting a segment and for example right clicking a mouse button and selecting a delete option or selecting a delete button provided by the portal 530. When a new template is chosen, the portal 530 can provide an empty canvas from which the subscriber can add segments by selecting an add segment button provided by the portal, and can reshape and relocate segments as described above.

To populate segments of a GUI template with media content of the subscriber, the portal 530 can present a selection of modules such as shown in FIG. 8. The modules can represent without limitation an audio module for arranging an audio content presentation in the personal TV channel, a moving image module for arranging a moving image content presentation in the personal TV channel, a still image module for arranging a still image presentation in the personal TV channel, or third party modules for arranging content from third party sources. Modules can work collectively to produce hybrid media content results (e.g., mixing audio and video). A module in the present context can represent a software application operating in the portal 530 which can be utilized by subscribers to manage content in the personal TV channel. The software application can represent a software development kit (SDK) which in whole or in part operates in the portal 530 and/or media devices of the subscriber (e.g., STB, DVR, PDA, cell phone, etc.) interfacing to the portal 530.

For example, when a subscriber selects a video module, the portal 530 can present a web page with fields that can be populated by the subscriber and in some instances fields with a drop-down menu. For instance, the portal 530 can prompt the subscriber to identify a device or devices from which media content will be supplied (e.g., DVR, STB, PDA, cell phone, etc.). If the device is not recognized by the portal 530, the subscriber can be prompted by the portal to provide communication data. Communication data can be represented by authentication data (login information, PIN, password) supplied by the subscriber, and/or a communication identifier of the device (e.g., IP address, domain name, SIP URI, etc.). In situations where the portal 530 is familiar with the media devices of the subscriber, the portal can provide a drop-down menu of the subscriber's devices. The portal 530 can become familiar with the subscribers devices from prior setup interactions, and/or preexisting knowledge of communication data of the devices the service provider has supplied to the subscriber to consume the services of the media communication system.

Once the device is identified, the portal 530 can establish communications with the media device in question by way of the network elements of the media communications system, and thereby locate the media content available on said device. The portal 530 can then present the subscriber the media content as it is organized in the media device (directories, folders, etc.). The portal 530 can also provide the subscriber a common content editor to edit selections of media content. The editor can for example redact portions of media content, combine media content types (audio and video), increase speed of presentation to minimize presentation time, resolution of presentation, quality of service setting, and so on. The subscriber can choose not to use the editor when the content is a live feed or the subscriber desires to maintain the original format of the content.

Once the subscriber has prepared the media content as desired, the portal 530 can present the subscriber in step 606 one or more selectable time slots for assigning portions of the subscriber's content. The time slots can be defined with a recurrence schedule (e.g., content presented from 8-9 μm every Wednesday for 3 weeks). Once the media content has been associated with a select time slot in step 608, the subscriber can select in step 610 a GUI template for presenting the media content and marketing content. For example, the subscriber can choose template 1 and in step 612 assign media content to segments 1-3, and marketing content to segment 4. The subscriber can use the modules described earlier to manage the media content in segment 1-3.

Once segment 4 has been identified as a marketing segment, the personal TV system (PTS) 130 can be informed by the portal 530 in step 614 of its location and configuration (such as its shape and surface area 3"×5") in the presentation area of the personal TV channel. The location and configuration information can be used by the PTS 130 to adapt the marketing content as required. The PTS 130 can also receive a marketing filter. The marketing filter can represent subscriber marketing preferences and a policy established by the service provider of the media communication system. The subscriber for instance can informed the portal 530 of its preferences for advertisers and can also define an exclusion list of advertisers which the subscriber does not want presented in its personal TV channel. The exclusion list can be used by the subscriber to for example prevent competitors from being presented on the personal TV channel. The service provider can also provide filtering criteria to prevent for example presentation of inappropriate content in the personal TV channel. The service provider can for example establish a policy to block marketing content of pornographic or adult content promoters for all personal TV channel subscribers, for subscribers who proactively ask for this type of filtering, or for subscribers who are known to be under age. In step 616 the PTS 130 can inform its marketing sources or partners that a portion of a select personal TV channel has been made available by its subscriber for placing marketing content.

Steps 602-616 can collectively represent a configuration or provisioning phase performed by the subscriber which can be performed independently of the execution or run-time steps 620-633 which illustrate the personal TV channel in use. This dichotomy is illustrated by the dashed line in FIG. 6.

With this in mind, the PTS 130 can be programmed to receive bids from the marketing sources to place marketing content on the personal TV channel. The marketing sources can increase their bid for placing their marketing content on the personal TV channel based any number of factors such as the popularity of the personal TV channel of the subscriber and the expected demographic profile of consumers viewing said channel. In step 622, the PTS 130 can monitor media content presented in the personal TV channel. The PTS 130 can monitor the media content while it is presented live. That is as media content of the subscriber is presented in the personal TV channel, the PTS 130 can monitor with common recognition technology audio content, images, and textual content presented in the personal TV channel.

Alternatively, the PTS 130 can be informed by the portal 530 of the programming schedule for media content in the personal TV channel and the sources of said media content. In this embodiment, the PTS 130 can be programmed to monitor the media content before its presentation in the personal TV channel. The PTS 130 can for example establish communications with the media sources (e.g., STB or DVR of subscriber) and monitor in non-real-time the media content before it is presented in the personal TV channel. In instances where the media content is always live (e.g., a web cam), the PTS 130 can be directed to monitor the media content as it is presented.

Whether the media content is monitored before or during its presentation, the PTS 130 can be directed to detect contextual patterns. Contextual patterns can be detected by searching through the media content for specific images, audio, and/or textual terms or phrases which can reasonably predict the context of the media content being presented in the personal TV channel. The PTS 130 can utilize common recognition technology such as speech detection, image processing, and text pattern matching to identify contextual patterns. For example, a subscriber of a personal TV channel might be interested in dirt bike racing, and therefore presents media content in audio, video and text relating to this specific activity. Using common recognition technology, the PTS 130 can identify dirt bike images, detect text and speech relating to the same. From recognizable patterns, the PTS 130 can detect in step 624 one or more contextual patterns relating to for example purchasing preferences for dirt bikes, locations where to engage in dirt bike racing, dirt bike racing stars of interest, and so on.

In step 626, the PTS 130 can select marketing content according to the bids given by the marketing sources, and according to the contextual patterns detected. The marketing content selected by the PTS 130 can be filtered by the marketing filter criteria discussed earlier. For example, in the above example, the PTS 130 can determine that there are 10 advertisements that are contextually related to the media content monitored in step 622. The PTS 130 can also determine that 7 out of the 10 items are not compliant with the marketing filter as specified by the subscriber and/or service provider of the media communication system.

The PTS 130 can further determine that 5 out of the 7 remaining advertisements relate to dirt bike manufacturers, and that one of the 5 advertisers (manufacturer A) has outbid the other four advertisers/manufacturers. The remaining 2 advertisements relate to promotions for dirt bike racing locations, and the sale of T-shirts depicting the dirt bike racing stars detected in the personal TV channel Based on this analysis, the PTS 130 can adapt the three advertisements (dirt bike manufacture A, dirt bike racing locations, and T-shirt sales of dirt bike racing stars) so that it fits the location and configuration of segment 4 of GUI template 1. The PTS 130 can then submit in step 628 the adapted marketing content for presentation in the personal TV channel. The presentation of the advertisement or promotion can be performed by the media source that broadcasts the subscriber's media content on the personal TV channel.

In one embodiment, the media source can be a media processor of the subscriber (e.g., an STB in FIGS. 1-3). In this embodiment, the PTS 130 submits the advertisement to the subscriber's media processor which in turn presents the marketing content in segment 4 of the personal TV channel. Alternatively, the PTS 130 can serve as the media source for the personal TV channel. In this embodiment, the PTS 130 receives the media content managed by the subscriber from a local media processor (e.g., STB, DVR, etc.), which is then presented in the personal TV channel with the adapted marketing content selected in step 626.

Once the selected marketing content is presented in the personal TV channel by the media processor of the subscriber or the PTS 130, the PTS determines in step 630 whether the marketing content is selected by a consumer of the personal TV channel. The detection can be performed by the media processor of the subscriber or the PTS 130 receiving for example a unicast signal requesting further information relating to at least a portion of the advertisement presented in the personal TV channel. The unicast signal can represent an HTTP request or other suitable forms of signaling information which identifies the advertisement as belonging to the personal TV channel of the subscriber.

Once a selection is detected by the PTS 130, the PTS can submit a payment to the subscriber in accordance with the bid made by the advertiser(s) of the selected marketing content. The higher the bids, the greater the payment. The payment can be performed utilizing a common electronic fund transfer system as directed by the PTS 130 to a bank account supplied by the subscriber at the time the subscriber registers with the service provider of the media communication system to present marketing content in a portion of the personal TV channel.

Upon reviewing the aforementioned embodiments, it would be evident to an artisan with ordinary skill in the art that said embodiments can be modified, reduced, or enhanced without departing from the scope and spirit of the claims described below. For example, method 600 can be adapted so that the media processor of the subscriber (e.g., STB of FIGS. 1-3) performs all the functions described in FIG. 6 or at least more than were described. In another illustrative embodiment, the marketing content can be presented in the personal TV channel without contextual analysis. For example, marketing content can be presented in the personal TV channel in an ad hoc fashion, or according to the highest bidders and the space available in the one or more segments selected by the subscriber for marketing content presentations.

Other suitable modifications can be applied to the present disclosure without departing from the scope of the claims below. Accordingly, the reader is directed to the claims section for a fuller understanding of the breadth and scope of the present disclosure.

Figure 10:
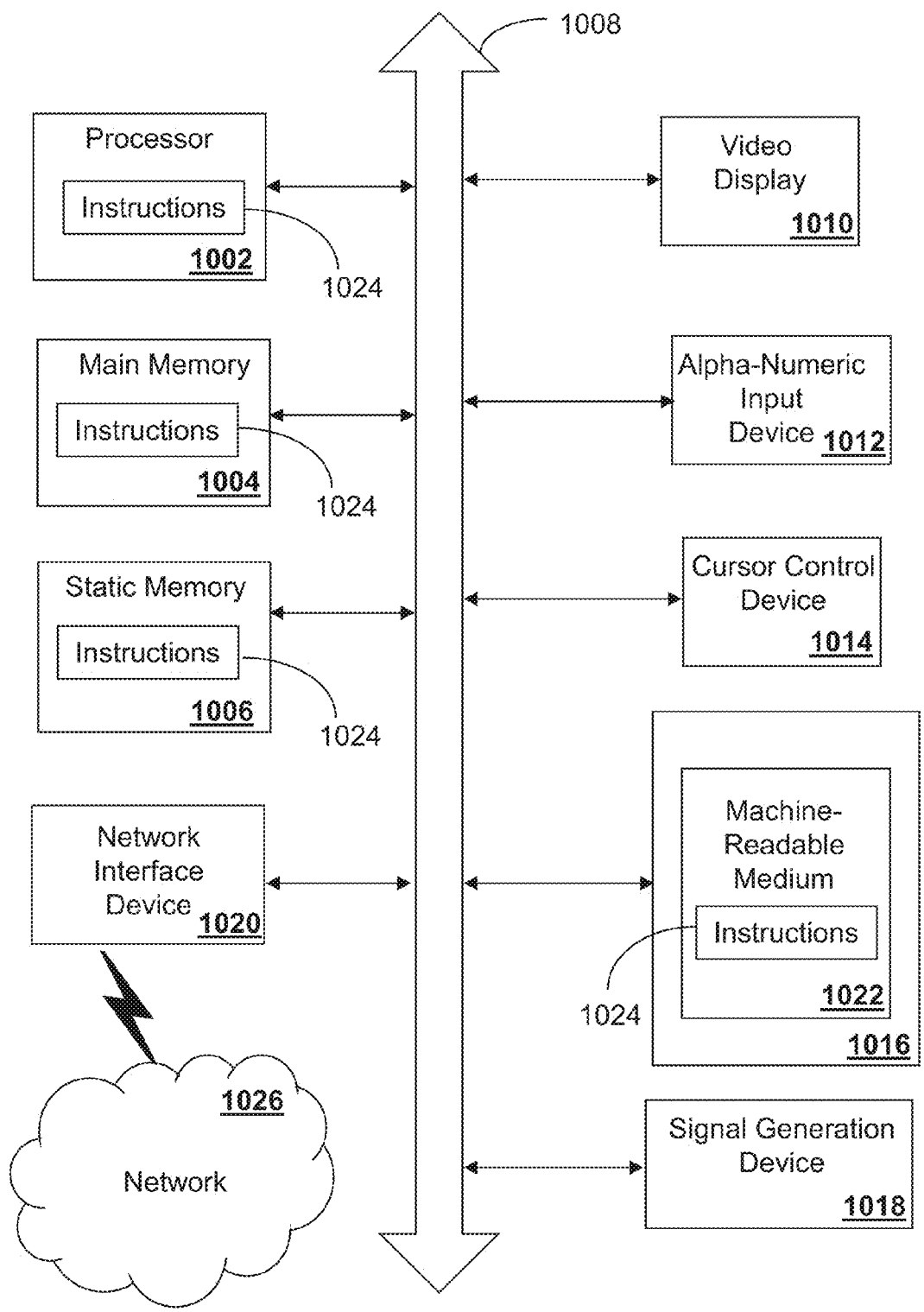
FIG. 10 is a diagrammatic representation of a machine in the form of a computer system within which a set of instructions, when executed, may cause the machine to perform any one or more of the methodologies discussed herein.

FIG. 10 depicts an exemplary diagrammatic representation of a machine in the form of a computer system 1000 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal display (LCD), a flat panel, a solid state display, or a cathode ray tube (CRT)). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a machine-readable medium 1022 on which is stored one or more sets of instructions (e.g., software 1024) embodying any one or more of the methodologies or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1024, or that which receives and executes instructions 1024 from a propagated signal so that a device connected to a network environment 1026 can send or receive voice, video or data, and to communicate over the network 1026 using the instructions 1024. The instructions 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   monitoring, by a processing system including a processor, media content associated with a personal television channel of a media communication system, wherein the personal television channel is accessible by media devices of a plurality of subscribers of a media content system, wherein the personal television channel comprises a two-dimensional, segmented display configuration,
   wherein identification of a first segmented area of the two-dimensional, segmented display configuration of a presentation of the personal television channel to contain the media content, identification of a second segmented area of the two-dimensional, segmented display configuration to contain marketing content, and identification of a restricted group of marketing sources of a plurality of marketing sources are determined by a first media device of a first subscriber of the plurality of subscribers of the media communication system, wherein the media content comprises real-time media content, non-real time media content, or both;
   determining, by the processing system, consumption data based on access of the personal television channel by the media devices of the plurality of subscribers of the media communication system;
   providing, by the processing system, the consumption data to the restricted group of marketing sources;
   determining, by the processing system, an advertisement from a plurality of advertisements of the restricted group of marketing sources based on a bid received from a marketing source of the restricted group of marketing sources, wherein the bid is received in response to the providing of the consumption data; and
   associating, by the processing system, the advertisement with the personal television channel, wherein a presentation of the personal television channel by the media devices of the plurality of subscribers includes the advertisement in the second segmented area of the two-dimensional, segmented display configuration.

2. The method of claim 1, further comprising, detecting, by the processing system, a contextual pattern in the media content is based on image pattern recognition utilizing pre-determined images wherein the media content comprises audio, moving images, still images or any combination thereof, wherein the, and wherein the bid is received without providing the marketing sources with demographic information of potential viewers of the personal television channel.

3. The method of claim 1, comprising:
   detecting a contextual pattern in the media content;
   receiving, by the processing system, from the first subscriber an advertisement filter; and
   selecting, by the processing system, the advertisement according to the contextual pattern and the advertisement filter.

4. The method of claim 1, wherein the advertisement is selected from a source of advertisements, and wherein the method comprises ensuring inappropriate advertisements from the source of advertisements do not appear in the personal television channel.

5. The method of claim 1, comprising:
   receiving, by the processing system, from the first subscriber a preference for advertisements; and selecting, by the processing system, the an advertisement according to a contextual pattern and the preference.

6. The method of claim 1, wherein the two-dimensional, segmented display configuration comprises a plurality of geometric shapes that define second segmented area of the two-dimensional, segmented display configuration of the personal television channel that present advertisements.

7. The method of claim 2, wherein the media communication system corresponds to an Internet protocol television communication system, a cable television communication system, a satellite television communication system, a public switched telephone network, a voice over Internet Protocol (IP) communication system, an IP Multimedia Subsystem combining the public switched telephone network and the voice over IP communication systems or any combination thereof.

8. A machine-readable storage device, comprising executable instructions, which when executed by a processing system including a processor, facilitate perform of operations comprising:
identifying a two-dimensional, segmented display configuration for presentation of content of a personal television channel of a first subscriber of a media communication system, wherein the two-dimensional, segmented display configuration comprises a first segmented area that contains media content and a second segmented area that contains marketing content;
determining a restricted group of marketing sources of a plurality of marketing sources, wherein the marketing content is based on the restricted group of marketing sources;
identifying the media content;
associating the media content with the personal television channel;
monitoring consumption data based on access of the personal television channel by equipment of a plurality of subscribers;
providing the consumption data to the restricted group of marketing sources;
determining marketing content based on a bid received from a source of the marketing content, wherein the bid is responsive to the providing of the consumption data; and
associating the marketing content with the personal television channel, wherein a presentation of the personal television channel on a display includes the media content in the first segmented area and the marketing content in the second segmented area.

9. The machine-readable storage device of claim 8, wherein the marketing content corresponds to an advertisement, wherein the personal television channel is selectable by the first subscriber of the media communication system from of a plurality of media channels presented by the media communication system.

10. The machine-readable storage device of claim 8, wherein the operations further comprise:
detecting a contextual pattern in the media content presented in the personal television channel; and
selecting the marketing content from a source according to the contextual pattern.

11. The machine-readable storage device of claim 8, wherein the media communication system corresponds to an Internet protocol television communication system, a cable television communication system, a satellite television communication system, a public switched telephone network, a voice over Internet Protocol (IP) communication system, an IP multimedia subsystem combining the public switched telephone network and the voice over IP communication systems or any combination thereof.

12. The machine-readable storage device of claim 8, wherein the determining of the restricted group of marketing sources comprises determining a list of excluded advertisers.

13. The machine-readable storage device of claim 8, wherein the operations further comprise:
detecting a selection of an item of the marketing content by a consumer of the personal television channel; and
submitting a payment to the first subscriber responsive to said detection.

14. The machine-readable storage device of claim 8, wherein the marketing content is selected from the source supplying marketing data, and wherein operations comprise filtering the marketing data from each of the source according to a filter.

15. A device, comprising:
a processing system including a processor; and
a memory that stores executable instructions that, when executed by the processing system, facilitate performance of operations comprising:
receiving identification of media content from equipment of a first subscriber of a plurality of subscribers of a media communication system;
associating the media content with a personal television channel of the first subscriber;
receiving a marketing preference from the equipment of the first subscriber, wherein a restricted group of advertisers that provide marketing content is based on the marketing preference;
receiving from the equipment of the first subscriber, identification of a two-dimensional, segmented display configuration, wherein the two-dimensional, segmented display configuration comprises a first region that contains the media content and a second region that contains the marketing content;
monitoring consumption data based on access of the personal television channel by other subscribers of the plurality of subscribers of the media communication system;
providing the consumption data to the restricted group of advertisers;
selecting a marketing content item of the marketing content based on a bid received from a source of the marketing content, wherein the bid is responsive to the providing of the consumption data; and
associating the marketing content item with the personal television channel, wherein the marketing content item is provided in the second region of the two-dimensional, segmented display configuration.

16. The device of claim 15, wherein the marketing content is contextually related to the media content.

17. The device of claim 15, wherein the media communication system comprises an Internet Protocol (IP) multimedia subsystem combining public switched telephone network and voice over IP communication systems.

18. The device of claim 15, wherein the marketing content comprises audio content, moving image content, still image content or any combination thereof.

19. The device of claim 15, wherein the operations further comprise receiving a list of excluded advertisers from the equipment of the first subscriber, wherein the restricted group of advertisers is based on the list of excluded advertisers.

20. The device of claim 15, wherein the operations further comprise:

detecting a contextual pattern in the media content of the personal television channel; and selecting the marketing content item from a marketing source based on the contextual pattern.

* * * * *